(12) United States Patent
Leveque et al.

(10) Patent No.: US 8,026,911 B2
(45) Date of Patent: Sep. 27, 2011

(54) METHOD AND A SYSTEM FOR GENERATING A SYNTHESIZED IMAGE OF A HAIR

(75) Inventors: Jean-Luc Leveque, Paris (FR); Basile Audoly, Chatenay-Malabry (FR); Frederic Leroy, Saint Cloud (FR); Bernard Querleux, Le Perreux (FR)

(73) Assignee: L'Oreal, Paris (FR)

( * ) Notice: Subject to any disclaimer, the term of this patent is extended or adjusted under 35 U.S.C. 154(b) by 1117 days.

(21) Appl. No.: 11/723,307

(22) Filed: Mar. 19, 2007

(65) Prior Publication Data
US 2007/0279413 A1    Dec. 6, 2007

Related U.S. Application Data

(60) Provisional application No. 60/811,423, filed on Jun. 7, 2006.

(30) Foreign Application Priority Data

Mar. 17, 2006  (FR) ...................................... 06 50933

(51) Int. Cl.
*G06T 15/00* (2006.01)
(52) U.S. Cl. ....................................... 345/419; 345/420
(58) Field of Classification Search .................. 345/419, 345/420

See application file for complete search history.

(56) References Cited

U.S. PATENT DOCUMENTS

| | | | | |
|---|---|---|---|---|
| 5,404,426 A * | 4/1995 | Usami et al. | ................... | 345/420 |
| 6,559,849 B1 | 5/2003 | Anderson et al. | | |
| 6,707,929 B2 * | 3/2004 | Marapane et al. | ............ | 382/100 |
| 6,980,888 B2 * | 12/2005 | Baker et al. | ................... | 700/236 |
| 2002/0021302 A1 | 2/2002 | Lengyel | | |
| 2002/0090123 A1 * | 7/2002 | Bazin | ............................. | 382/128 |
| 2003/0013994 A1 * | 1/2003 | Rubinstenn et al. | ........... | 600/587 |
| 2003/0063794 A1 * | 4/2003 | Rubinstenn et al. | .......... | 382/154 |
| 2004/0145656 A1 * | 7/2004 | Betra | ............................... | 348/77 |
| 2004/0239689 A1 * | 12/2004 | Fertig et al. | .................... | 345/641 |
| 2005/0004475 A1 * | 1/2005 | Giron | ............................. | 600/476 |

OTHER PUBLICATIONS

Marschner et al., Light Scattering from Human Hair Fibers, International Conference on Computer Graphics and Interactive Techniques, ACM SIGGRAPH 2003 Papers, 2003.*

Xu et al., V-HairStudio: An Interactive Tool for Hair Design, IEEE Computer Graphics and Applications, vol. 21, Issue 3, May 2001.*

(Continued)

*Primary Examiner* — Xiao Wu
*Assistant Examiner* — Charles Tseng
(74) *Attorney, Agent, or Firm* — Oliff & Berridge, PLC

(57) ABSTRACT

The invention relates to a method of generating a synthesized image of a hair, comprising the following steps:

calculating the shape of the hair by applying a behavioral relationship determining the shape of the hair as a function of a physical parameter linked to a mechanical property of the hair, in particular the linear density;

producing an image of the hair of shape that has been calculated in this way.

The behavioral relationship may be given by the minimization of the following function:

$$E = \frac{K}{L}\int_0^1 \left[\frac{1}{2}(\tilde{k}(\tilde{s}) - \alpha)^2 + \frac{1}{\beta}\tilde{z}(\tilde{s})\right]d\tilde{s},$$

where $\alpha = Lk_0$ and $\beta = K/g\mu L^3$, and where L designates the length of the hair, $k_0$ its spontaneous curvature, K its bending moment, $\mu$ its linear density and g the acceleration due to gravity, $\tilde{s}$ the curvilinear abscissa relative to the length of the hair, $\tilde{k}$ its local curvature relative to its length and $\tilde{z}$ its height relative to its length.

33 Claims, 9 Drawing Sheets

OTHER PUBLICATIONS

Pai, STRANDS: Interactive Simulation of Thin Solids using Cosserat Models, Eurographics 2002, vol. 21, No. 3, 2002.*

Chu et al., An Efficient Brush Model for Physically-Based 3D Painting, Pacific Graphics 2002.*

Rosenblum, Robert E., et al., "Simulating the Structure and Dynamics of Human Hair: Modelling, Rendering and Animation," The Journal of Visualization and Computer Animation, vol. 2, No. 4, pp. 141-148 (Oct. 1991).

Anjyo, Ken-ichi, "A Simple Method for Extracting the Natural Beauty of Hair," Computer Graphics, vol. 26, No. 2, pp. 111-120 (Jul. 1992).

Magnenat-Thalmann, Nadia et al., "State of the Art in Hair Simulation," MIRALab, CUI, University of Geneva.

Hadap, Sunil et al., "Modeling Dynamic Hair as a Continuum," Eurographics, vol. 20, No. 3 (2001).

Barzel, Ronen, "Faking Dynamics of Ropes and Springs," IEEE Computer Graphics and Applications, vol. 17, No. 3, pp. 31-39 (May-Jun. 1997).

Robbins, Clarence R., "Chemical and Physical Behavior of Human Hair," $4^{th}$ Edition, Springer (2002).

Office Action issued on Jul. 15, 2011 in U.S. Appl. No. 13/064,984.

* cited by examiner

METHOD AND A SYSTEM FOR GENERATING A SYNTHESIZED IMAGE OF A HAIR

This non provisional application claims the benefit of French Application No. 06 50933 filed on Mar. 17, 2006 and U.S. Provisional Application No. 60/811,423 filed on Jun. 7, 2006.

The present invention relates to methods and systems for simulating the appearance of a hair.

By "appearance" is meant the shape of a hair implanted in the scalp of a person and subject to the gravitational field, simulation of the shape being complemented, where appropriate, by simulation of the color of the hair or the texture of the hair.

U.S. Pat. No. 5,404,426 discloses a method for displaying a style of hair deformed by an external force.

This method is not considered to be robust and precise as desired.

Pai discloses in STRANDS: Interactive Simulation of Thin Solids using Cosserat Models, EUROGRAPHICS 2002, Volume 21 (2002) Number 3, methods for simulation of the deformation of hair and other objects as wires and topes inter alia.

SUMMARY

There exists a need for a system or method of simulating the appearance of a hair in a manner that may be useful in the field of cosmetics.

There also exists a need to facilitate the characterization of human hairs, whether natural or treated.

It is equally desirable to be able to benefit from hair-care products adapted to a particular shape of hair to be treated and/or to a particular shape of hair to be obtained after treatment.

The invention aims to satisfy some or all of these needs.
Simulation Method

One aspect of the invention is a method of generating a synthesized image of a hair, including:
 calculating the shape of the hair by applying a behavioral relationship determining the shape of the hair as a function of a physical parameter linked to a mechanical property of the hair;
 producing an image of the hair of shape that has been calculated in this way.

Such a method may be employed in the context of advising a customer and/or studying the effects of a hair-care composition and/or promoting a hair-care composition and/or training professionals such as hairdressers or beauticians, for example.

Depending on the behavioral relationship adopted, the shape of the hair may be determined when the hair is stationary or when it is being moved by the action of an external force, for example a force exerted by the wind or one or more other hairs.

For example, the method according to the invention may be used to simulate the behavior of several hairs, for example by applying the behavioral relationship to each of the hairs.

The synthesized image of the hair may be incorporated into the image of a human head, which may be a real image, possibly a 3D image.

At least one physical parameter may be selected from the following list: the length of the hair, the radius or radii of the hair, the ellipticity of the hair, the spontaneous curvature of the hair relative to one or more axes, its density, the linear density of the hair, the angle or angles of embedment of the hair in the scalp, the bending moment or moments of the hair, its Young's modulus, its Poisson coefficient, the spontaneous twist of the hair, its twist in the gravitational field, its twist moment, the porosity of the hair.

At least one physical parameter may in particular be selected from the following list: its density, the linear density of the hair, the angle or angles of embedment of the hair in the scalp, its Young's modulus, its Poisson coefficient, the spontaneous twist of the hair, the porosity of the hair.

Elements for adjusting a simulation parameter and the calculated image may displayed on the same screen.

The behavioral relationship may depend only on the embedment of the hair in the scalp and on two reduced parameters each depending on one or more physical parameters.

The synthesized image of the hair may include the representation of a hair lying in a plane.

The behavioral relationship may be given by the minimization of the following function:

$$E = \frac{K}{L}\int_0^1 \left[\frac{1}{2}(\tilde{k}(\tilde{s}) - \alpha)^2 + \frac{1}{\beta}\tilde{z}(\tilde{s})\right]d\tilde{s},$$

where $\alpha = Lk_0$ and $\beta = K/g\mu L^3$, and where L designates the length of the hair, $k_0$ its spontaneous curvature, K its bending moment, $\mu$ its linear density and g the acceleration due to gravity, $\tilde{s}$ the curvilinear abscissa relative to the length of the hair, $\tilde{k}$ its local curvature relative to its length and $\tilde{z}$ its height relative to its length.

The synthesized image may be a representation in perspective of the hair not entirely contained in a plane.

The behavioral relationship may depend on three angles defining the embedment of the hair in the scalp and at least two reduced parameters, the first reduced parameter depending for example on the natural curvature of the hair and the second reduced parameter depending for example on the length of the hair and the acceleration due to gravity.

The behavioral relationship may be given by the minimization of the following function E:

$$\frac{1}{2}\int\left[K_x^f(k_x(s) - k_x^0)^2 + K_y^f(k_y(s) - k_y^0)^2 + K^t(\tau(s) - \tau^0)^2\right]ds + S\rho g\int(L-s)\frac{dz(s)}{ds}ds$$

where $\rho$ designates the density of the hair, L its total length, S the area of its section and g the acceleration due to gravity, $K_x^f$ and $K_y^f$ the x-axis and y-axis bending moments, respectively, $K^t$ the twisting moment, s the curvilinear abscissa, $k_x(s)$, $k_y(s)$ and $\tau(S)$ the x-axis and y-axis curvatures and the twist in the gravitational field, respectively, $k_x^0$, $k_y^0$ and $\tau^0$ the x-axis and y-axis spontaneous curvatures and the spontaneous twist, respectively, and $z(s)$ the height of the hair.

The physical parameter may vary as a function of the curvilinear abscissa measured along the hair.
Interactive System Independently of or in combination with the above, the invention provides an interactive system for representing a hair, the system comprising:
 a computer for calculating the shape of a hair by applying a behavioral relationship determining the shape of the hair as a function of a physical parameter linked to a mechanical property of the hair, in particular a parameter characterizing an intrinsic property of the material forming the hair, for example its linear density; and a device for generating an image of said hair of shape that has been calculated in this way.

The computer may be located at a point of sale, for example, or in a hairdressing salon, or remotely located and consulted by means of a terminal and a computer and/or telephone network. The computer may comprise a personal microcomputer or a server, for example.

The interactive system may further comprise an element for adjusting the physical parameter. The adjustment element may comprise a cursor movable between at least two positions corresponding to different values of a physical parameter. The adjustment element may include a field in which the value of a physical parameter may be displayed and modified.

The device for generating a synthesized image of the hair may comprise display means.

The computer may enable the display of an element for adjusting a parameter and the calculated image on the same screen. The computer may in particular enable the display on the screen of elements for adjusting a plurality of physical parameters characteristic of the shape of the hair represented.

The behavioral relationship may depend only on the embedment of the hair in the scalp and two reduced parameters each depending on one or more physical parameters. The behavioral relationship may further depend on three angles defining the embedment of the hair in the scalp and two or more reduced parameters, the first reduced parameter depending at least on the natural curvature of the hair and the second reduced parameter depending at least on the length of the hair and gravity.

The behavioral relationship may be given by the minimization of the following function:

$$E = \frac{K}{L}\int_0^1 \left[\frac{1}{2}(\tilde{k}(\tilde{s}) - \alpha)^2 + \frac{1}{\beta}\tilde{z}(\tilde{s})\right]d\tilde{s},$$

The behavioral relationship may be given by the minimization of the following function E:

$$\frac{1}{2}\int \left[K_x^f(k_x(s) - k_x^0)^2 + K_y^f(k_y(s) - k_y^0)^2 + K^t(\tau(s) - \tau^0)^2\right]ds + S\rho g \int (L-s)\frac{dz(s)}{ds}ds$$

The representation of the hair may be a representation of the hair lying in a plane.

The synthesized image may further be a representation in perspective of the hair not entirely contained in a plane.

The interactive system may include means for representing said hair in relief.

The physical parameters may include at least two angles characteristic of the embedment of the hair in its support.

The physical parameters may omit the color of the hair.

The system may further include a database including information linked to the evolution of a physical parameter of a hair as a function of a treatment applied to the hair.

The treatment may be selected from the following list: permanent waving, crimping, decrimping, dyeing, drying of a wet hair, application of a composition to the hair, in particular a coating composition, application of a gel, setting, cutting, conditioning, thickening, lengthening, external climatic events, in particular rain, wind, sun.

Two treatments may differ from each other at least in the quantity of composition applied, the thickness of the layer of composition applied, the duration of the treatment, the diameter of the crimping iron, the temperature of the crimping iron.

A treatment may vary as a function of the curvilinear abscissa measured along the hair.

The device for generating images may be configured to generate a virtual image of the hair after the application of a treatment.

The device for generating images may be configured to display simultaneously an image of the hair before treatment and an image of the hair after application of the treatment.

A physical parameter may vary as a function of the curvilinear abscissa measured along the hair.

Atlas

Independently of or in combination with the above, the invention provides in an atlas comprising:

at least two images generated by the above method; and information associated with each image linked to a physical parameter of the hair.

For example, such an atlas may comprise a plurality of images corresponding to different degrees of one or more physical parameters of the hair. The images in the atlas may be printed out or displayed on a screen or contained in an electronic form in a file.

The information may comprise one or more of the following: an alphanumeric character, a symbol, a drawing, a color, or a bar code.

The images may comprise images of a hair lying in a plane. The images may also comprise perspective images of a hair not entirely contained in a plane.

Product

Independently of or in combination with the above, the invention provides a product comprising:

a hair-care composition;

an image generated by the above method; and information associated with the image representing a physical parameter of the hair.

The image and the associated information may for example be useful for informing the customer or the hairdresser as to the type of hair for which the composition is suitable or the type of result that can be obtained.

Characterization Method

Independently of or in combination with the above, the invention provides a method of characterizing a hair, including the step of enabling a comparison between an image of the hair to be characterized and an image of a virtual hair obtained by the above method.

For example, the characterization may aim to quantify a physical parameter of the real hair that is the subject of the comparison.

Where appropriate, the characterization method may be implemented at different times, for example to highlight the effects of a treatment or an external event.

Where applicable, a physical parameter of the hair may be modified as a function of the comparison, in order to enhance the resemblance between the image of the hair to be characterized and the image of the virtual hair. For example, from one to four or even only one or two physical parameters may be modified.

A measurement of a physical parameter of the hair and a simulation parameter may be adjusted to achieve the required degree of matching between the images of the hair to be characterized and the virtual hair.

A simulation parameter may be modified until a predefined degree of matching of the shapes of the hair to be characterized and the virtual hair has been achieved.

The physical parameter measured may be selected from the following list: the length of the hair, the mean radius of the hair, the ellipticity of the hair, the linear density of the hair, the modulus of elasticity of the hair, its bending moment or moments, its twisting moment, its spontaneous curvatures, its spontaneous twisting.

The characterization method may be implemented after receiving an electronic image of the hair to be characterized, in particular a computer image. The hair to be characterized may be used itself instead of the image of the hair to be characterized.

Independently of or in combination with the above, the invention further provides a method of generating digital data defining the shape of a hair, comprising:

receiving an image of a hair;
from the shape of the hair in the received image and from a behavioral relationship, generating digital data comprising one or more values of one or more physical parameters linked to a mechanical property of the hair.

Prescription Method

Independently of or in combination with the above, the invention provides a method of prescribing a hair-care composition, comprising:

determining a characteristic of a hair from a head of hair to be treated by comparing the real hair with a virtual hair obtained by the above method;
prescribing a hair-care composition as a function of the characteristic that has been determined.

The selected hair-care composition may be sent to the subject via a distribution center, for example.

Hair-Treatment Method

Independently of or in combination with the above, the invention provides a hair-treatment method, comprising:

associating with a customer, information linked to the shape of a hair of the customer by comparing the real hair to a virtual hair obtained by the above method;
as a function of that information, selecting a hair-care composition from a set of compositions, in particular products identified by corresponding identifiers;
treating the customer using the selected product.

Method of Modeling the Impact of a Treatment

Independently of or in combination with the above, the invention provides a method of modeling the impact of a treatment or an external event applied to a hair, comprising:

displaying a synthesized image of a hair;
displaying a synthesized image of said hair, preferably obtained by the above method, after it has undergone the treatment or the selected external event.

Where appropriate the treatment or the external event may have been selected from a plurality of treatments or external events.

Such a method shows the appearance of the hair after the treatment has been effected, compares the appearance of the hair before and after the treatment, and shows the result of the treatment in advance, for example to enable the user to make an informed decision as to the treatment to be applied. This enables a specific treatment solution to be proposed to a user, for example, including showing them the result that will be obtained with such a treatment.

For example, the method may show the effect on the appearance of the hair of a treatment for coating it.

The synthesized image of the treated hair may be calculated by modifying a physical simulation parameter, the modification depending in particular on the selected treatment.

An image of the hair after treatment and an image of the hair before treatment may be displayed simultaneously on the same screen.

The treatment to be applied may be one or more from the following list: permanent waving, crimping, combing, decrimping, dyeing, wetting, drying of a wet hair, application of a coating composition to the hair, application of a gel, setting, cutting, conditioning, thickening, lengthening, external climatic events, in particular rain, wind, sun, hair dressing, geometrical constraints due for example to clamping of hair with ties.

The treatment may vary as a function of the curvilinear abscissa measured along the hair.

The mechanical effects of coating the hair or of a loss or uptake of moisture by a hair may be simulated, for example.

Hairdresser Training Method

Independently of or in combination with the above, the invention provides a hairdresser training method, comprising:

selecting a treatment to be applied to a hair;
displaying a virtual image generated by the above method of a hair that has undergone the selected treatment.

Method of Promoting the Sale of a Hair-Care Composition

The invention further provides a method of promoting the sale of a hair-care composition, for example a permanent waving, straightening, and/or smoothing composition for the hair, taking into account information representing one or more physical parameters linked to the shape of the hair, for example two or more physical parameters linked to the shape of the hair.

That promotion may be effected via any communications channel. For example it may be effected by a retailer, directly at a point of sale, by radio, by television, or by telephone, for example in the context of commercials or short messages. It could equally be effected via the print press or any other form of document, for example for advertising purposes. It could be effected via any other appropriate data processing network, for example via the Internet or via a mobile telephone network. It could equally be effected directly on the product itself, in particular on its packaging or on any explanatory material associated with it.

BRIEF DESCRIPTION OF THE DRAWINGS

The invention can be better understood on reading the following detailed description of non-limiting embodiments thereof and examining the appended drawings, in which.

MORE DETAILED DESCRIPTION

According to the invention, the physical behavior of the hair is modeled in two dimensions or in three dimensions by means of a behavioral relationship.

Two-Dimensional Modeling

Figure 1:
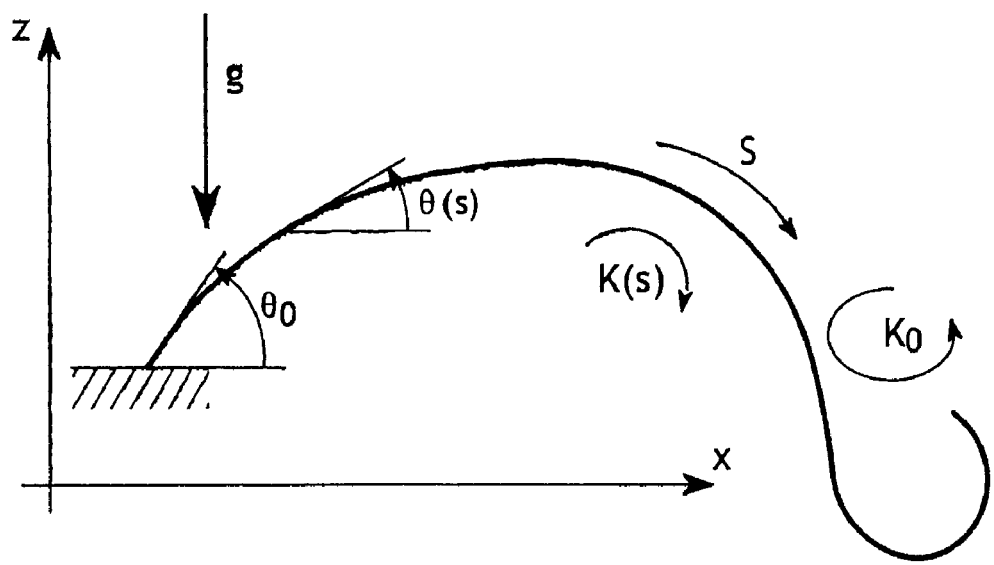
FIG. 1 represents diagrammatically a model of a hair lying in a plane.

For simplicity, it is assumed below that the hair lies only in a plane, as shown in FIG. 1, so that only a restricted number of physical parameters need be retained.

It is assumed that the properties of the hair are homogeneous from its root to its tip, i.e. that the physical parameters linked to the mechanical characteristics of the hair do not vary as a function of the curvilinear abscissa s as measured along the hair, and that the hair remains in the vertical plane (x, z) in which it is placed, i.e. the possibility of vertical helical curling is ignored.

The shape of the hair is given by the orientation $\theta(s)$ of its tangent at any point, which is an unknown function of the energy E of the hair. The following geometrical formulae relate the height z(s) of the hair and the local curvature k(s) to its direction $\theta(s)$ at any point:

$$z(s) = \int_0^s \sin(\theta(s'))ds', \text{ and}$$

$$k(s) = \frac{d\theta(s)}{ds}.$$

The shape of the hair is given by the function $\theta(s)$ that minimizes the energy E:

$$E = \frac{K}{L}\int_0^1 \left[\frac{1}{2}(\tilde{k}(\tilde{s}) - \alpha)^2 + \frac{1}{\beta}\tilde{z}(\tilde{s})\right]d\tilde{s}$$

where $\alpha = Lk_0$ and $\beta = K/g\mu L^3$, and where L designates the length of the hair, $k_0$ its spontaneous curvature, K its bending moment, $\mu$ its linear density and g the acceleration due to gravity, $\tilde{s}$ the curvilinear abscissa relative to the length of the hair, $\tilde{k}$ its local curvature relative to its length and $\tilde{z}$ its height relative to its length.

The energy could be minimized by a numerical method, for example by dividing the hair into a plurality of discrete segments of constant curvature k(s). Each segment may be considered as unextensible and unshearable. The curvature of the hair is then considered as a piecewise constant function, and the hair consists of a set of successive circular arcs joined in a regular manner, each having a varying curvature that is adjusted to minimize the total energy. The conditions at the embedment and free end limits are taken into account by integrating these equations using a non-linear drawing technique, and where appropriate numerical continuation.

Another possible method consists in minimizing the energy of the hair by analytical means.

Given the above equation, the equilibrium shape of a hair depends only on two reduced parameters $\alpha$ and $\beta$ and the angle $\theta_0$ at which the hair is anchored in the scalp. Accordingly, for the same anchoring angle, a first hair has strictly the same shape as a second hair having half the natural curvature but that is twice as heavy and four times stiffer in twisting, for example.

A hair can be characterized by determining only two well-selected combinations of reduced physical parameters (the parameters $\alpha$ and $\beta$).

The reduced parameter $\alpha$ quantifies the magnitude of the spontaneous curvature. A low value of the number $\alpha$ characterizes a naturally straight hair whereas high values of the number $\alpha$ correspond to a very marked spontaneous curvature.

The reduced parameter $\beta$ represents the sensitivity of the hair to gravity. If the value of $\beta$ is high, the hair is more sensitive to gravity, and is therefore qualified as "stiff". In contrast, if the value of $\beta$ is small, the effect of gravity is decisive and the hair is qualified as "flexible". This property defined by $\beta$ depends on a combination of the linear density and the stiffness of the hair.

Figure 2:
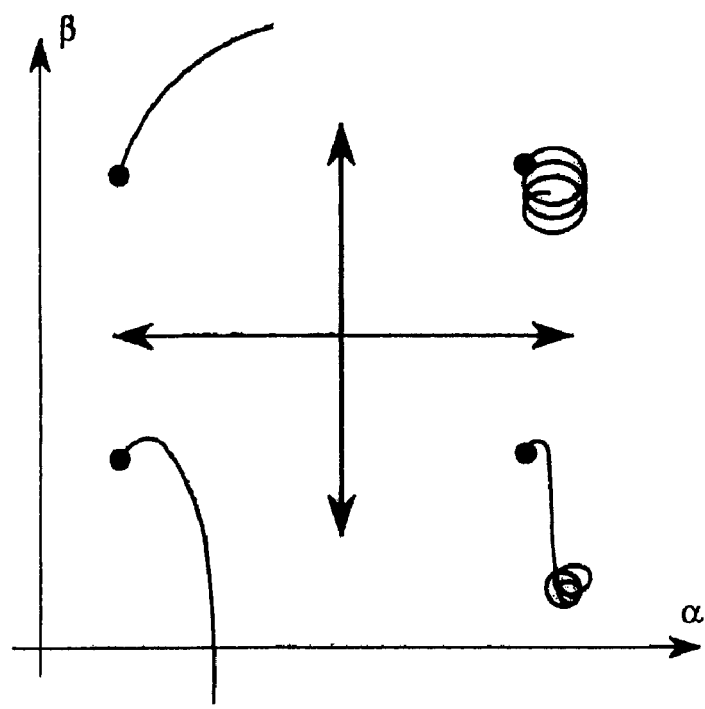
FIG. 2 is a diagram showing the evolution of the behavior of a modeled hair as a function of reduced parameters.

A diagram can therefore be drawn showing the typical shapes of hairs as a function of the reduced parameter $\alpha$ plotted along the abscissa axis and the reduced parameter $\beta$ plotted up the ordinate axis, as in FIG. 2.

Top left in the diagram is spiky hair, which is straight and stiff, and relatively insensitive to gravity. Top right is frizzy hair having a high spontaneous curvature.

If the value of $\beta$ is lower, i.e. if the hair is heavier, the modulus of curvature lower or the length greater, the situation is one of those in the bottom portion of the diagram.

Bottom left is drooping hair, which is sensitive to gravity, although its spontaneous curvature is high. Such a hair comes to be oriented vertically downward at a distance from the root that is short compared to its length. On the right is the hair profile known as "ringlets": the hair is sensitive to gravity, and therefore tends to hang vertically, but at the same time has very high spontaneous curvature, which is seen in the curls that form near its end. A "curl length" may be defined that designates the length of the hair over which the hair forms curls, i.e. the total length of the hair less the length over which the hair does not form curls.

The above four fundamental configurations of the hair are archetypes and all intermediate configurations are possible on varying one or more physical parameters.

Three-Dimensional Modeling

The hair is modeled using an elastic rod model, which rod is oriented in the direction z in the absence of curvature and spontaneous twisting.

The section of the hair is assumed to be elliptical. The major axes of the section are oriented in the x and y directions, and $r_x$ and $r_y$ denote its major radii. The Young's modulus of the material is denoted E and its Poisson coefficient is denoted $\nu$.

The bending moment $K_x^f$ in the direction x is given by the following equation:

$$K_x^f = \frac{E\pi}{4}r_x r_y^3.$$

A similar equation gives the bending moment in the direction y.

The twisting moment $K^t$ is given by:

$$K^t = \frac{E\pi(r_x r_y)^3}{2(1+\nu^2)(r_x^2 + r_y^2)}.$$

The elastic rod has a spontaneous curvature that simulates its tendency to curl. The natural shape of the hair is therefore described by its spontaneous curvature in the x direction, its spontaneous curvature in the y direction and its spontaneous twist, respectively denoted:

$k_x^0$, $k_y^0$ and $\tau^0$.

The shape of the hair, which is considered non-extensible, in the gravitational field has parameters determined by three unknown functions of the curvilinear abscissa: the curvature in the x direction, the curvature in the y direction, and the twist, respectively denoted $k_x(s)$, $k_y(s)$ and $\tau(s)$.

These three functions express the variation of the material orthonormic system of axes $\{t_x, t_y, t_z\}$ attached to the section:

$$\frac{d}{ds}\begin{pmatrix} t_x(s) \\ t_y(s) \\ t_z(s) \end{pmatrix} = \begin{pmatrix} 0 & -\tau(s) & k_y(s) \\ \tau(s) & 0 & -k_x(s) \\ -k_y(s) & k_x(s) & 0 \end{pmatrix}\begin{pmatrix} t_x(s) \\ t_y(s) \\ t_z(s) \end{pmatrix}$$

For conditions at the limits defined by the embedment of the hair in the scalp, the orthonormic system of axes $\{t_x, t_y, t_z\}$ has a prescribed edge value, given for example by the angles defining the embedment of the hair in the scalp, of which there are three, for example.

Knowing the material system of axes $\{t_x(s), t_y(s), t_z(s)\}$, it is possible to work back to the spatial conformation of the center line of the hair $\{x(s), y(s), z(s)\}$ by integrating:

$$\frac{d}{ds}\begin{pmatrix} x(s) \\ y(s) \\ z(s) \end{pmatrix} = t_z(s).$$

Minimizing the energy of the hair over the unknown functions $k_x(s)$, $k_y(s)$ and $\tau(s)$ determines the equilibrium shape(s) of the hair. This energy E is the sum of the elastic energy and the potential energy of the hair in the gravitational field, and the expression for it is:

$$\frac{1}{2}\int\left[K_x^f(k_x(s)-k_x^0)^2 + K_y^f(k_y(s)-k_y^0)^2 + K^t(\tau(s)-\tau^0)^2\right]ds +$$

$$S\rho g \int (L-s)\frac{dz(s)}{ds}ds$$

In this equation, $\rho$ designates the density of the hair, L is total length, $S=\pi r_x r_y$ the area of the section, and g the acceleration due to gravity.

The equilibrium shape of the hair that minimizes the above energy may be determined by numerical means, the hair being discretized along its length: the two curvatures of the hair and its twist are considered as piecewise constant functions. The hair then consists of a set of successive helixes joined in a regular manner, each having two curvatures and a twist that can be varied and that are adjusted to minimize the total energy. The conditions at the embedment and free end limits are taken into account by integrating these equations using a non-linear drawing technique, and where appropriate numerical continuation.

Another possible method consists in minimizing the energy of the hair by analytical means.

Implementations

Figure 3:
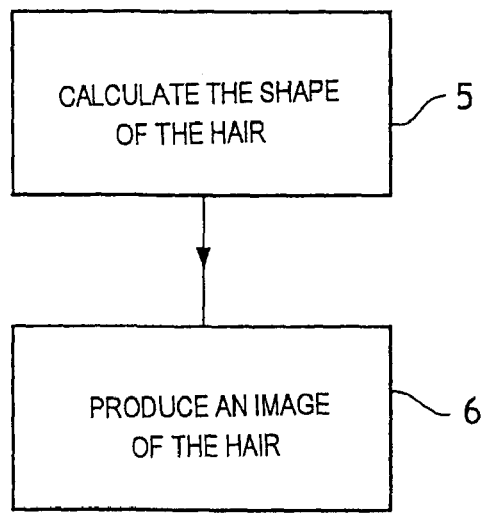
FIG. 3 is a block diagram corresponding to an example of a method of generating a synthesized image.

Each form of modeling just described may be used to generate a synthesized image a hair. The following steps may be executed for this purpose, as illustrated in FIG. 3:
 in a first step 5, calculating the shape of the hair by applying one of the above-mentioned two-dimensional or three-dimensional behavioral relationships, thereby determining the shape of the hair as a function of one or more physical parameters linked to a mechanical property of the hair; and
 in a second step 6, producing an image of the hair with a shape calculated in this way.

Figure 4:
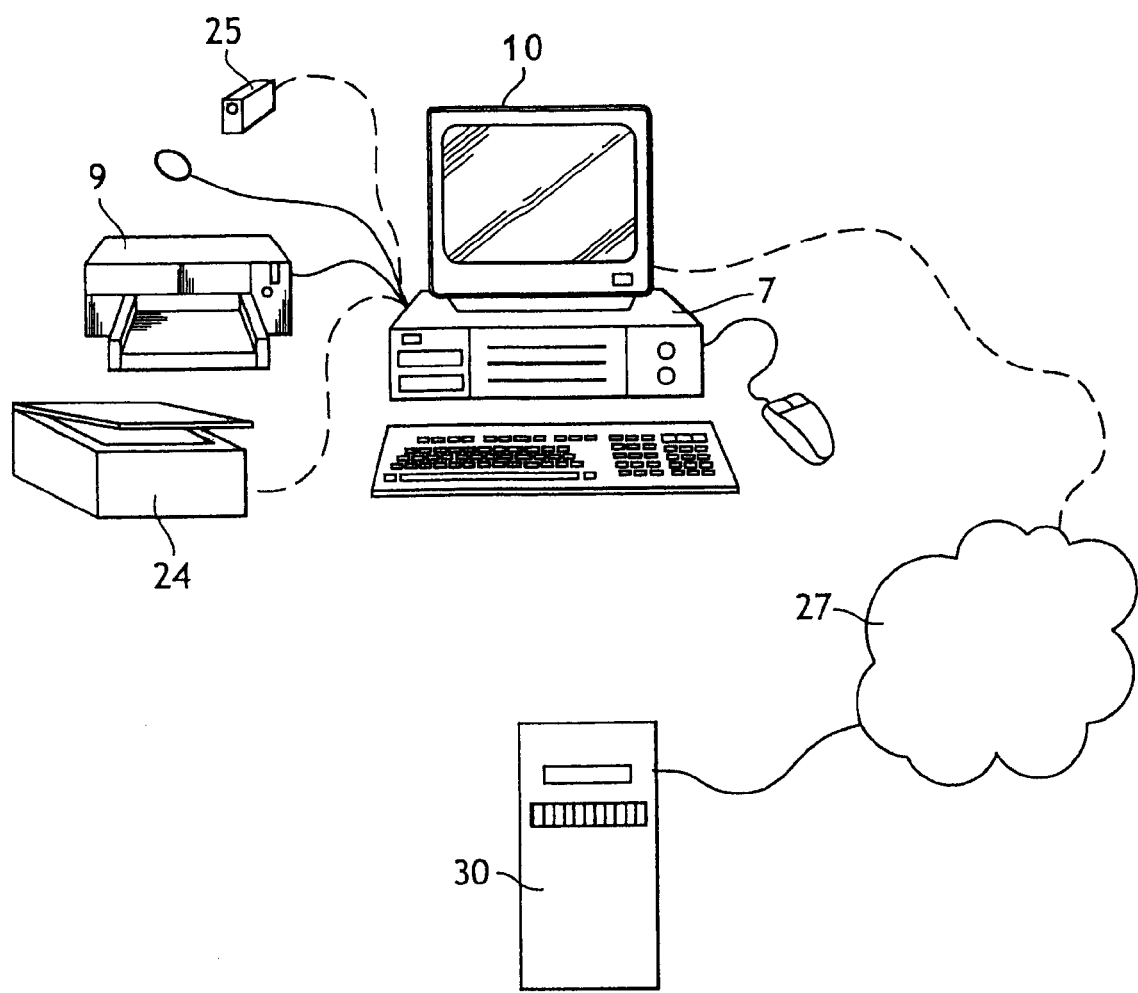
FIG. 4 represents diagrammatically an example of a system for generating a synthesized image of the hair.

This method may be implemented by means of an interactive system for representing a hair, including, as shown in FIG. 4:
 a computer 7, for example a personal computer, where appropriate connected by a computer network 27 to a remote server 30, for example an Internet site server, the computer 7 calculating the shape of a hair by applying one of the modeling methods described above;
 a screen 10 for displaying an image of a hair of shape that has been calculated in this way, for example a liquid crystal screen, a cathode ray tube screen, or plasma screen; and
 where appropriate a printer 9, which may replace the screen 10.

Figure 5:
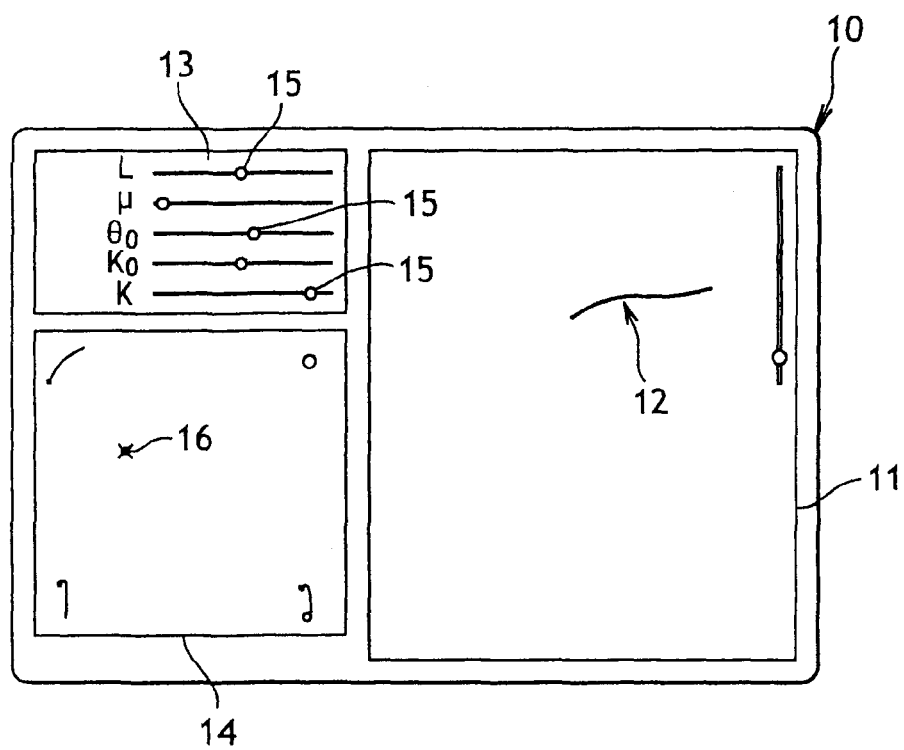
FIGS. 5 to 7 are screenshots.

The result of the simulation may be displayed in the form shown in FIG. 5, with the synthesized image of the hair 12 in a first area 11 of the screen and, in a second area 13 of the screen, elements 15 for adjusting physical parameters that influence the mechanical behavior of the hair.

The system may further include means (not shown) providing a stereoscopic view of the virtual hair or hairs.

Figure 6:
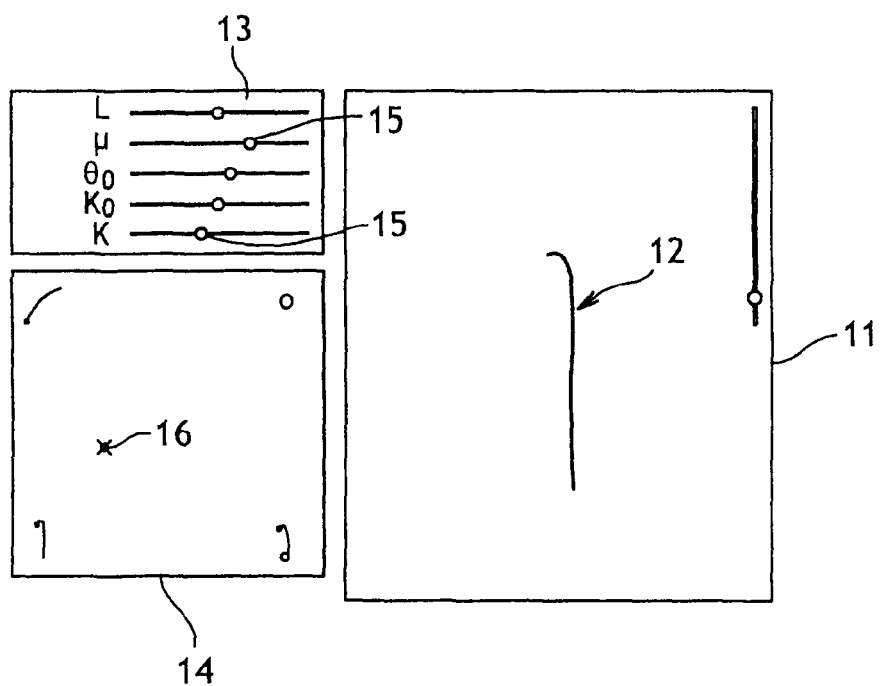
Figure 7:
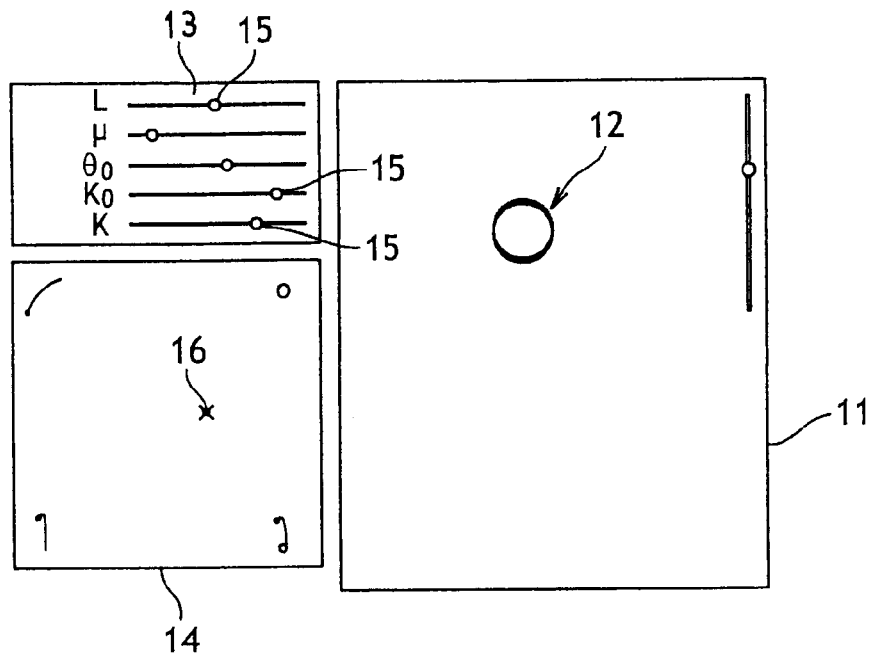

FIGS. 6 and 7 show examples of how the shape of the virtual hair is modified if the values of the simulation parameters change.

The adjustment element 15 includes a cursor movable between two or more positions corresponding to different values of the physical parameter concerned, for example.

In the example considered here, five physical parameters may be adjusted by means of respective cursors, namely the length L of the hair, the linear density μ of the hair, the angle $\theta_0$ of embedment of the hair in its support, the spontaneous curvature $k_0$ of the hair, and the bending moment K.

Of course, using a different number of physical parameters does not depart from the scope of the present invention. For example, the physical parameters displayed and that where applicable may be modified may relate directly to the appearance of the hair, for example the length of the hair, or may be linked to mechanical characteristics of the hair, for example the radius or radii of the hair, the ellipticity of the hair, the spontaneous curvature of the hair relative to one or more axes, the angle or angles of embedment of the hair in the scalp, the spontaneous twist of the hair, and/or to characteristics linked to one or more materials constituting the hair, for example its Young's modulus, its Poisson coefficient, its bending moments, its twist moment, the coefficient of elasticity of the hair, the porosity of the hair, the density or the linear density of the hair.

Where appropriate, a physical parameter may vary as a function of the curvilinear abscissa of the hair. For example, the twist may be greater at certain points along the hair. The variation of certain physical parameters as a function of the curvilinear abscissa may be linked to past treatments effected on the hair and to how it grows, which may vary in time, or how it ages, the hair becoming increasingly older in the direction away from its root. For example, the hair may have a distal portion that has been subjected to a bleaching treatment and a proximal portion that has grown since that treatment and has different mechanical characteristics. Where appropriate, the system may be configured to enable the user to define the manner in which a parameter varies along the hair as a function of the curvilinear abscissa. For example, one or more parameters may have a first value over a first portion of the length of the hair and a second value, which may be different from the first, over a second portion of its length.

Where appropriate, the system may include or access a database containing typical values of certain parameters, for example as a function of the ethnic hair type, its color and/or certain treatments effected.

Displaying elements for adjusting reduced parameters such as the reduced parameters α and β defined above in the area 13 of the screen 10, alone or with one or more of the physical parameters listed above, does not depart from the scope of the present invention.

In the example shown, the physical parameters may be adjusted by means of a cursor that can be moved by means of a mouse. The area 13 of the screen 10 may also include one or more fields in which the value of a physical parameter may be displayed and modified by means of the keyboard.

Finally, the screen 10 may include an area 14 for a synthesized presentation corresponding to the FIG. 2 diagram, in which synthesized images of the four above-described archetypal shapes are displayed together with a pointer 16 showing the positioning of the virtual hair 12 displayed in the area 11 in relation to those archetypes.

In the example shown in FIG. 5, the pointer 16 is displayed substantially in the left-hand half of the area 14, which means that the reduced parameter α has a relatively low value, and it may be seen that the virtual hair 12 displayed in the area 11 is in fact relatively stiff.

In the examples of FIGS. 5 to 7, if a physical parameter displayed in the area 13 is varied, the shape of the hair 12 displayed in the area 11 is modified in corresponding fashion, and the pointer 16 is moved.

Between the FIG. 5 and FIG. 6 results, certain simulation parameters have remained unchanged, in particular the length L, the embedment angle $\theta_0$, and the spontaneous curvature $k_0$, but the linear density μ of the hair has been increased and the bending moment K has been reduced. The hair in FIG. 6 has become more flexible and more drooping.

In the FIG. 7 example, the spontaneous curvature $k_0$ of the hair has been increased and the virtual hair 12 forms curls.

In what has just been described, the virtual hair 12 is represented lying in a plane, but the present invention encompasses a synthesized image consisting in a representation in perspective of the hair not entirely contained within a plane. The embedment of the hair in the scalp may then be defined by two or three angles.

As indicated above, the physical parameters may optionally vary as a function of the curvilinear abscissa.

If the physical parameters vary as a function of the curvilinear abscissa, as measured along the hair, the behavior of a hair having an older portion already subjected to a treatment, for example dyeing or permanent waving, may be distinguished from the behavior of a more recent portion that has not yet been exposed to treatment liable to have durably affected one or more of its mechanical characteristics, for example.

Characterization of the Hair

Figure 8:
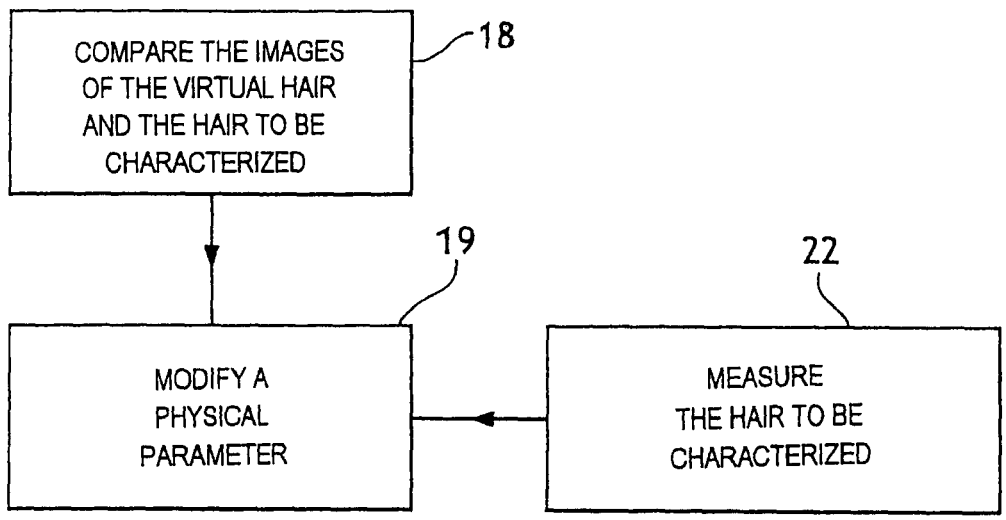
FIG. 8 is a block diagram corresponding to an example of a method of characterizing the hair.

The system and method described above may be used to characterize a hair, for example by implementing the steps of the method shown in FIG. 8.

Figure 9:
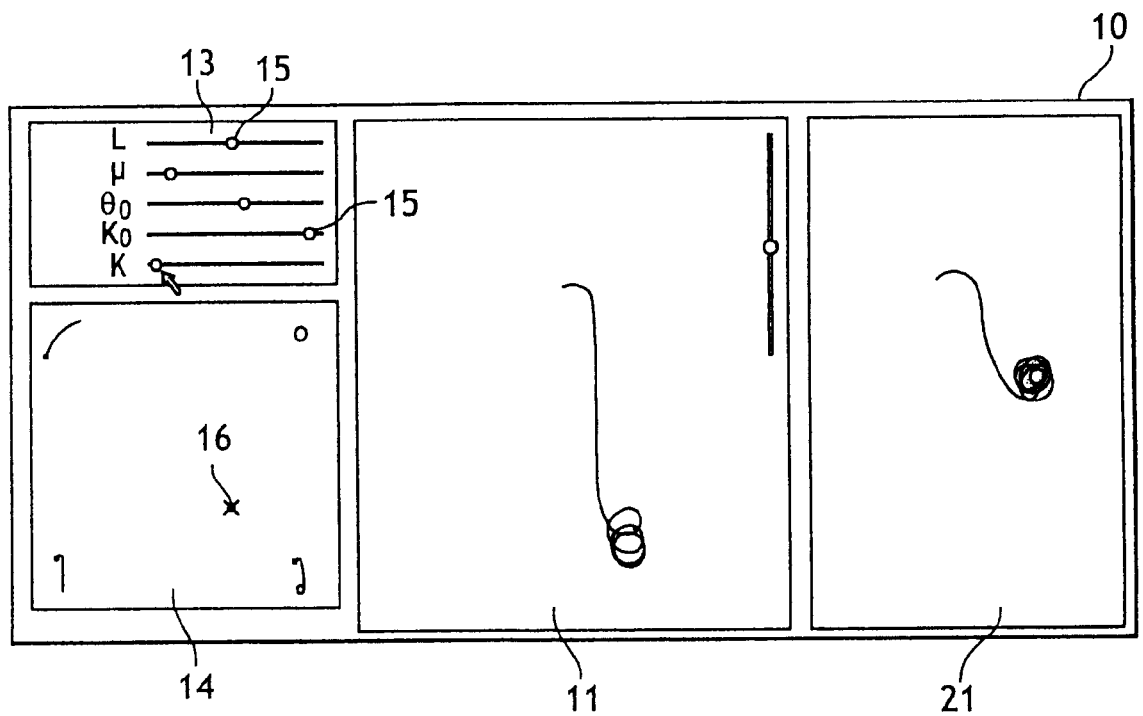
FIG. 9 is a screenshot.

In a first step 18, an image of the hair to be characterized is compared to an image of a virtual hair obtained by the simulation method described above.

Where appropriate, the image of the hair to be characterized may be displayed in an area 21 of the screen 10, as shown in FIG. 9, and preferably to the same scale, to enable simultaneous observation of the hair to be characterized and the virtual hair.

Then, in the step 19, a physical parameter of the hair may be modified as a function of the result of the comparison, with a view to enhancing the resemblance between the image of the hair to be characterized and the image of the virtual hair.

In the FIG. 9 example, the hair to be characterized is a hair having relatively abundant "ringlets" at its end, and once again certain parameters may be modified to increase the resemblance between the images appearing in the areas 11 and 21 of the screen.

For example, the step 19 may consist in manually and/or automatically adjusting the physical simulation parameters until the shapes of the hair to be characterized and the virtual hair are identical to within 20%, better still to within 10%, or even to within 5%. An estimate ε of the difference between the shapes of the real hair and the virtual hair may be given, for example, the virtual and real hairs being assumed to have the same length l and a common end, by the equation:

$$\varepsilon = \frac{1}{L^3}\int_0^L (r_v(s) - r_r(s))^2 ds$$

in which $r_v(s)$ designates the position in space of the mid-line of the virtual hair as a function of the curvilinear abscissa s and $r_r(s)$ represents that of the mid-line of the real hair.

The estimate may be less than 20%, better still less than 10%, or 5%, for example, so the shapes are considered to be identical to within 20%, 10%, or 5%, respectively.

Where appropriate, the step 22 may include one or more measurements of a physical parameter of the hair and adjustment of one or more physical parameters of the simulation as a function of that measurement in order to obtain a sufficient resemblance between the images of the hair to be characterized and the virtual hair.

The physical parameter measured is one of the following, for example: the length of the hair, the ellipticity of the hair, the mean radius of the hair, the density of the hair, the linear density of the hair, the modulus of elasticity of the hair, the spontaneous curvatures of the hair, the spontaneous twist of the hair, the degree of dehydration of the hair, its bending moment(s), its twisting moment.

Where appropriate, this measurement may be effected by means of a suitable device connected to the computer 10 of the FIG. 4 system.

The head of hair of a person may be characterized on the basis of the same hair or different hairs, for example three hairs, taken from the same head of hair. For example, one hair may be taken from the crown and one other hair from each side of the head. Where appropriate, the results of measurements effected on a greater number of hairs may be processed statistically, in order to average values measured or determined by simulation, for example. Alternatively, the variations of the parameters characterizing a hair may be measured for hairs situated at different places in the head of hair.

These characterization results may be listed in a database with information concerning the persons from whom the hairs were taken.

In this way characteristics of a hair may be recorded and thus known at different times in its life cycle, in particular one or more of the physical parameters used to simulate the appearance of the hair. Such information may be useful for prescribing a treatment or choosing a hair-care composition, for example.

The result of the characterization may be received in electronic form, for example via the computer network 27, and may delivered, in written or oral form, at a point of sale of products, in a beauty or hair salon, at the surgery of a dermatologist, or remotely, for example by connecting to an Internet site server.

The hair may be characterized manually, semi-automatically or automatically.

The image displayed in the area 21 may be acquired by means of a two-dimensional acquisition system such as a scanner 24 or a video camera 25, for example, as shown in FIG. 4, or by means of a three-dimensional acquisition system, such as a stereovision system, for example.

The hair to be characterized may be used itself instead of the image of the hair to be characterized, for example by applying it to the screen using adhesive tape or any other appropriate fixing means.

Characterization may where appropriate be followed by giving advice. The advice may include the prescription of at least one hair-care composition having an action on a physical parameter of the hair, for example. This may be a composition for a form of hair treatment other than a dyeing treatment, for example permanent waving, crimping, straightening, and/or decrimping, or coating of the hair, for example.

Prescription

Figure 10:
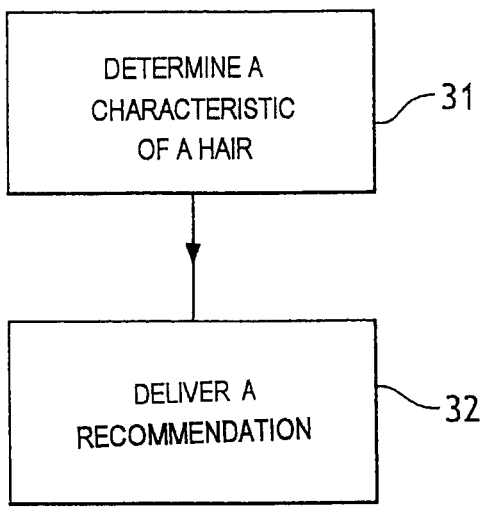
FIGS. 10 to 13 are block diagrams corresponding to other examples of methods according to the invention.

FIG. 10 shows a method of prescribing a hair-care composition, in which:
- in the step 31 a characteristic of a hair of a head of hair to be treated is determined by comparing, for example using the method shown in FIG. 8, the real hair with a virtual hair obtained by the method shown in FIG. 3, for example;
- in the step 32 a recommendation is made that is linked to the prescription of a hair-care composition as a function of the characteristic determined in this way.

For example, this prescription method may be used at a point of sale, in a hairdressing or beauty salon, in a perfume outlet, in a department store, or remotely by means of the computer network 27.

Where appropriate, after the step 32, a product adapted to obtain a required result is handed or sent to the user or used in situ.

The product may be supplied through any sales channel, in particular through a shop or by mail order, or through a beauty parlor or a hairdressing salon, for example.

Treatment

Figure 11:
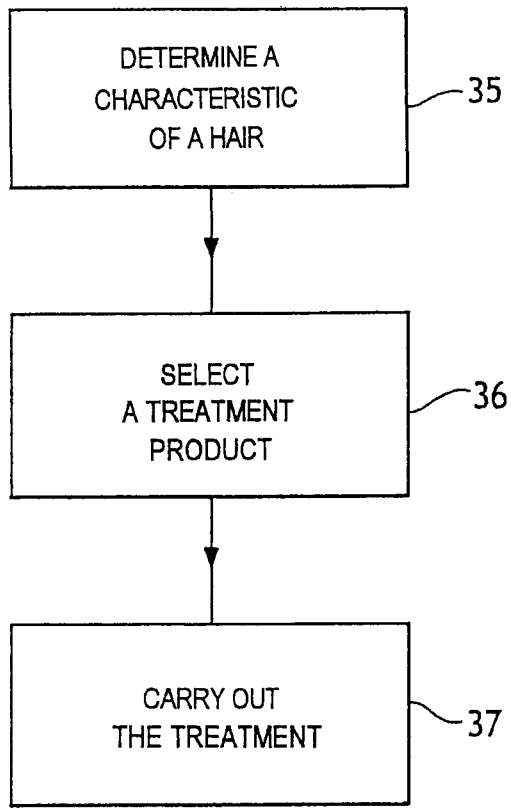

The method and the system described above may be used to apply a hair-treatment process, as shown in FIG. 11, which process includes the following steps:
- in the step 35, associating with a customer a characteristic representing a physical parameter linked to the shape of a hair by comparing, for example using the method shown in FIG. 8, a real hair of the customer to a virtual hair obtained by the method shown in FIG. 3, for example;
- in the step 36, as a function of that characteristic, selecting a hair-care composition from a set of compositions identified by corresponding characteristics;
- in the step 37, treating the customer with the selected composition.

The treatment may be selected from the following list: permanent waving, crimping, decrimping, dyeing, drying of a wet hair, application of a composition to the hair, in particular a coating composition, application of a gel, for example a polymer coating, setting, cutting, conditioning, thickening, lengthening.

Modeling the Impact of a Treatment or Exposure to a Predetermined Event

Figure 12:
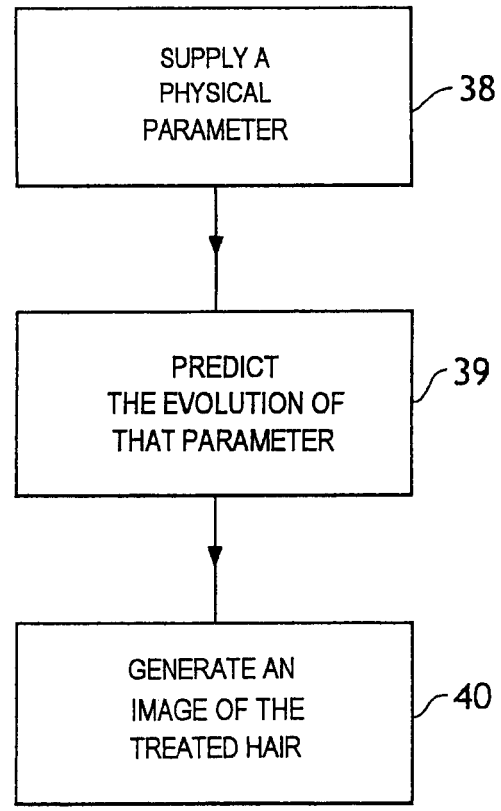

The method and system described above further enable the implementation of a method, shown in FIG. 12, of modeling the impact of a treatment applied to a hair or of exposure to a predetermined event, in particular a climatic event, the method including the following steps:
- in the step 38, displaying a synthesized image of a hair;
- in the step 39, selecting a treatment to be applied or a predetermined event;
- in the step 40, displaying a synthesized image of said hair after undergoing the selective treatment or being exposed to said event.

The synthesized image of the hair to be treated may be obtained by the method described above with reference to FIG. 3.

The synthesized image of the treated hair may be calculated by modifying a physical parameter of the untreated hair. The modification may depend on the treatment selected. To this end, the system may for example include a database including information reflecting the evolution of physical parameters of a hair as a function of treatments applied to the hair. The same applies to a hair exposed to a predetermined event.

Two treatments that may be selected for purposes of simulation may differ from each other at least in terms of the quantity of composition applied, the thickness of the layer of composition applied, the distribution of the composition on the hair, the duration of the treatment, the diameter of the crimping iron or the temperature of the crimping iron, for example 180° C. or 200° C.

A treatment whose impact is to be modeled may vary as a function of the curvilinear abscissa measured along the hair.

An image of the hair after treatment and an image of the hair before treatment may be displayed simultaneously on the same screen. The screen may include two areas for this purpose, for example, as shown in FIG. 9.

This method may further be used for example to simulate the mechanical effects of coating the hair or of a loss or uptake of moisture, linked for example to exposure of the hair to rain or sun. The effect of water may be to increase the curvature and/or the density of the hair, for example.

By modeling the impact of such events on a treated hair, such a method may further be used to demonstrate the resistance of a hair conditioning composition or treatment to external climatic events, for example rain, wind or the action of the sun.

The methods described above may further be used to evaluate the effect of a composition as a function of the quantity thereof that was applied to the hair or remains on the hair after rinsing.

The increase in the weight of the hair after the application of a coating composition may be evaluated, for example.

The different behavior of a hair when dry or wet may also be evaluated.

For example, these evaluations may seek to determine a reduction or an increase in the volume of the head of hair.

Modeling the impact of a treatment may be used to develop new hair-care treatments or compositions, for example. Such modeling may further be used for promotional or educational purposes, for example to explain to a customer or a hairdresser the impact of a treatment on the appearance and/or the behavior of the hair.

Hairdresser Training

Figure 13:
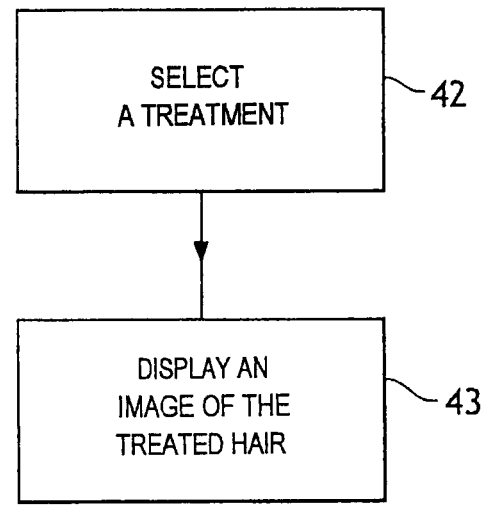

The invention further consists in a hairdresser training method, as shown in FIG. 13, including the following steps:
- in the step 42, selecting a treatment to be applied to the hair;
- in the step 43, displaying a virtual image of a hair that has undergone the selected treatment, the image being generated by the method shown in FIG. 12.

Thus the effects of a treatment on the hair may be assessed more easily.

Atlas

Figure 14:
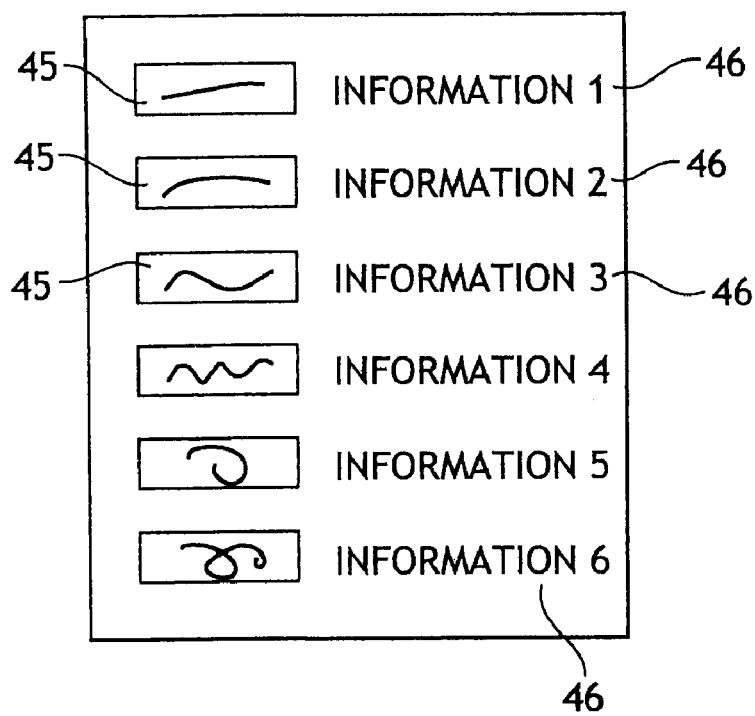
FIG. 14 represents diagrammatically an example of an atlas according to the invention.

The invention may be used to produce an atlas like that shown in FIG. 14, for example, which comprises:
- at least two images 45 generated by the method shown in FIG. 3, for example six images 45 in the example shown; and
- information 46 associated with each image, representing a physical parameter of the hair.

The invention may be used to classify hairs as a function of the information 46 representing a physical parameter characteristic of the hair, for example. The image 45 may correspond to the theoretical shape of the hair associated with the information 46.

The hairs may be classified as a function of the reduced parameters α and β described above, for example, or other physical parameters characteristic of the hair.

An atlas containing such information may be used to characterize a hair before a treatment or to characterize the effect of a treatment, for example.

The images from the atlas may optionally be printed out, for example being displayed on a computer screen.

The images may further take the form of digital files, and, instead of being displayed, they may be used by a shape recognition system or some other system, for example a system for determining which image from the atlas most closely resembles a real hair.

Product

The invention may advantageously be used to associate with hair-care compositions, information representing physical parameters characteristic of the hair.

Figure 15:
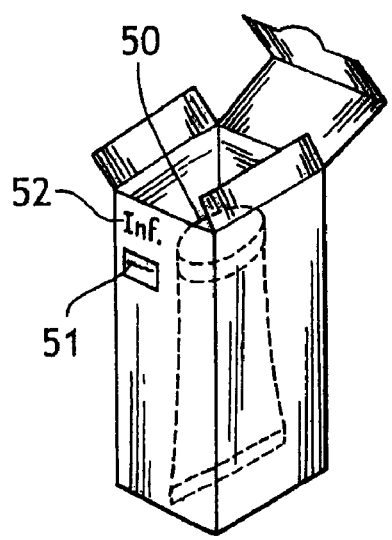
FIG. 15 represents diagrammatically an example of a product according to the invention.

For example, FIG. 15 shows a product including:
- a hair-care composition 50 in a container;
- an image 51 generated by the method shown in FIG. 3; and
- information 52 associated with the image, that information 52 representing physical parameters of the hair.

The hair-care composition 50 is a permanent waving, crimping, straightening, and/or decrimping composition for the hair, for example, or a composition for shaping the hair, for example a hair gel. The composition may further be a shampoo. The hair-care composition may act on the shape of the hair but also, where applicable, on its color and/or its brilliance. This action may be more or less durable and/or more or less reversible.

The information 52 may indicate the effectiveness of the composition, for example, in particular in terms of variation of physical parameters linked to the shape of the hair or to characteristics of a head of hair for which it is suitable and/or a result that can be achieved.

The product may further include information associated with the composition and representing parameters not linked to the shape of the hair, for example. A parameter that is not linked to the shape of the hair may represent the color and/or the brilliance of the hair, for example, before or after treatment.

This further information may for example indicate the coordinates in a calorimetric space such as the CIE lab or Munsell space, for example, of the color of the head of hair to be treated or looked up or a shade on a scale of shades.

The information may be expressed in various forms, directly apparent to a person or otherwise.

The information may include an alphanumeric character, a symbol, a drawing, a color, or a bar code.

The images may be images of hairs lying in a plane or alternatively perspective images of hairs not entirely contained within one plane.

Experimental Results

Experiments were made to compare hair exposed to various cosmetic conditions and corresponding simulated shapes. Caucasian hair and asian hair were tested.

Physical parameters of these hairs are listed below.

| Type | Length (cm) | Mean Radius (μm) | Ellipticity ($R_{max}/R_{min}$) | Young modulus (GPa) |
|---|---|---|---|---|
| Asian | 17 | 45 ± 5 | 0.9 ± 0.1 | 3.7 ± 0.7 |
| Caucasian | 17 | 30 ± 5 | 0.9 ± 0.1 | 0.7 ± 0.4 |

The hair samples were prepared and put into shape on a hair-curler so as to set to each fiber a curvature and a twist. The hair was wetted, rolled onto the hair-curler and let dry for 12 hours.

Thereafter, one end of the hair is fixed to an orientable support and the other end is set free, so as to simulate hair embedded into scalp.

For the simulation, the fiber was considered to be made of an isotrope and homogeneous elastic material which was characterized by a given number of physical parameters directly observable, such as parameters describing the geometry of the fiber (length, mean radius, ellipticity), the natural shape (two curvatures, twist), the orientation of the embedment in the scalp (three angles) and its elasticity (Young modulus, Poisson coefficient, volumic density).

The modification of the shape of the hair following a cut or wetting of the hair was both simulated and compared with experimental results.

Figure 16:
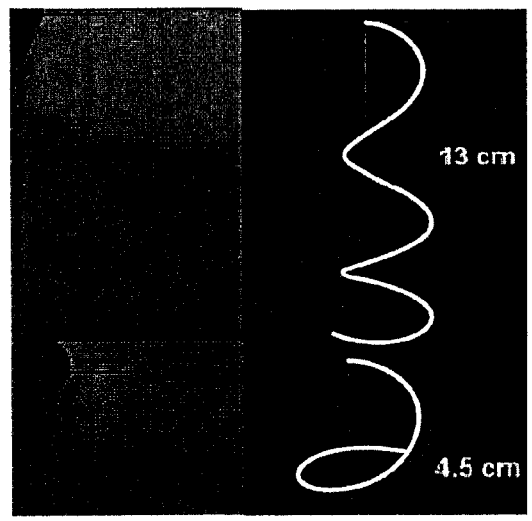
FIG. 16 shows comparison of experimental results and simulated shape for long and short hair.

FIG. 16 shows comparison between real Caucasian hair (left) and the simulated hair (right), before and after cut.

The cut of the hair was simulated by reducing the value of the length of the fiber.

One may observe that the simulated shape of the loop is satisfying both before and after cut.

Figure 17:
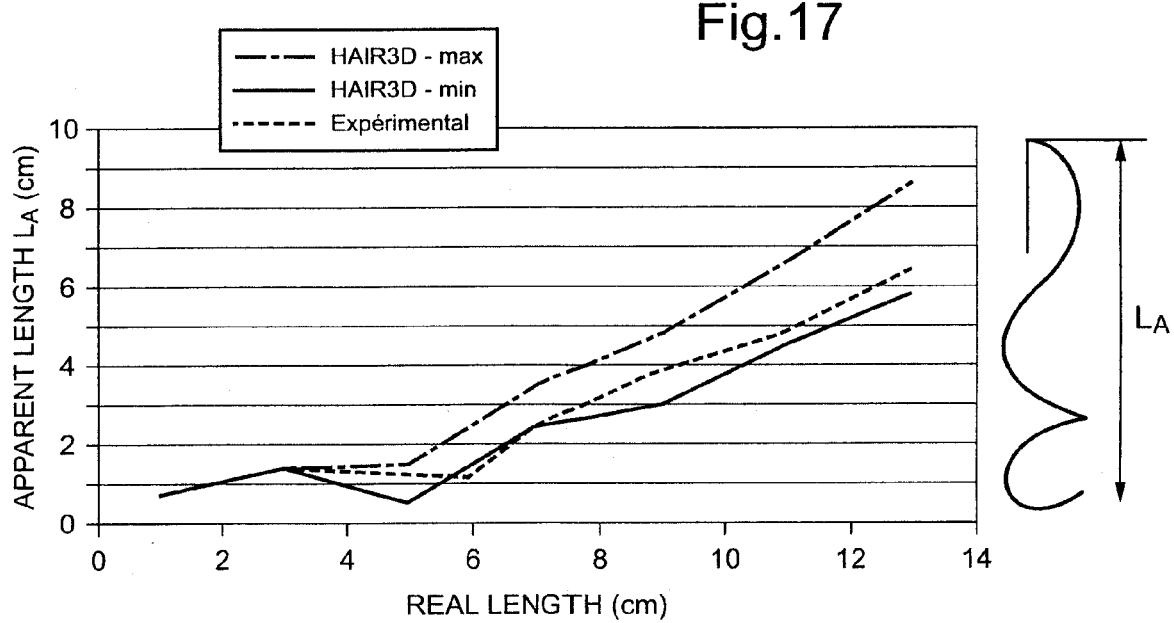
FIG. 17 and FIG. 18 show boundaries of simulation results with respect to experimental results.
Figure 18:
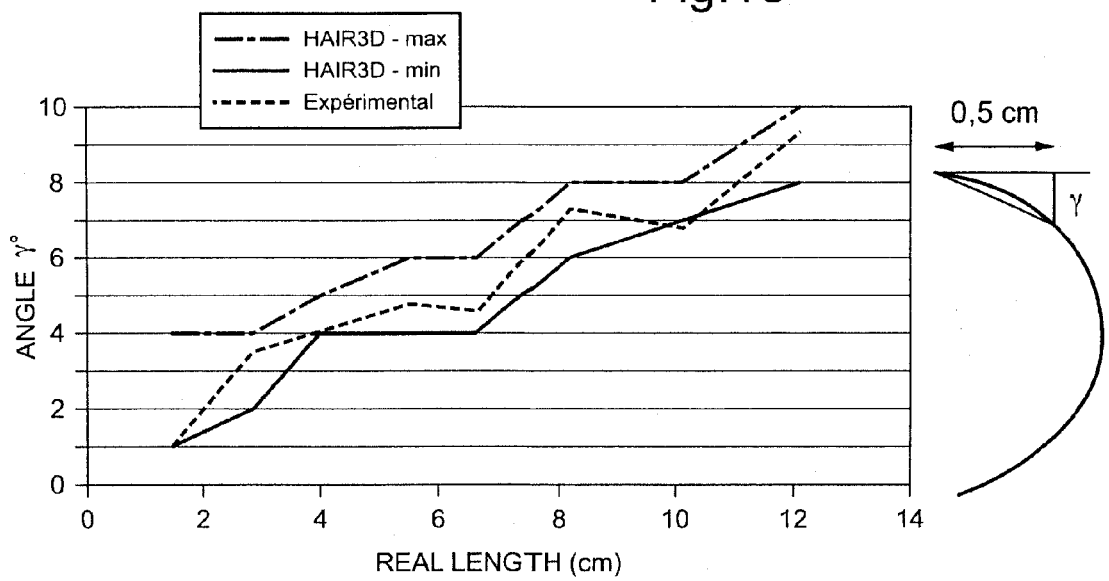

FIGS. 17 and 18 show the comparison between the experimental results and the simulated shape, taken into account the experimental uncertainty on the values of the parameters. The extreme values for the simulation led to two curves HAIR 3D-max and HAIR 3D-min.

One can see that the experimental results for various values of apparent length and angle γ fall within the min and max curves.

Figure 19:
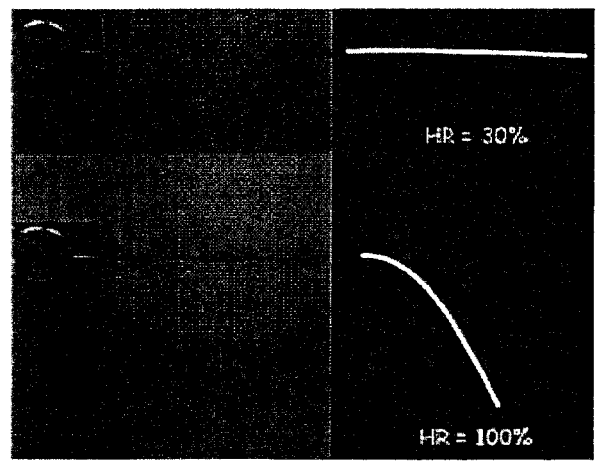
FIG. 19 shows comparison of experimental results and simulated shape for dry and wet hair.

FIG. 19 shows the comparison of the results for dry asian hair and wet asian hair.

It is known from C. R. Robbins, Chemical and Physical Behaviour of Human Hair, 4$^{th}$ Edition, Springer (2002) which is incorporated by reference, that a dry hair has a diameter which is about 10% lower than the wet hair and a Young modulus between 200% à 1000% greater. With these data, the wet hair was simulated with a diameter 10% greater.

The Young modulus of the wet hair which was a priori unknown, was determined by setting the descriptors of apparent length La and embedment angle γ so that the simulated hair has a shape that coincides with the observed evolution. A unique value of 0.4 GPa was found for which the two descriptors calculated on the simulated shape corresponds to the experimental value. This value of 0.4 GPa fall in the range of published values of the wet hair.

The invention is not limited to the examples that have just been given. For example, the energy of the hair may be expressed directly as a function of physical parameters or as a function of reduced parameters based on those physical parameters, and either by two-dimensional modeling or by three-dimensional modeling.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

Throughout the description, including in the claims, the expression "comprising a" should be understood as being synonymous with "comprising at least one", unless specified to the contrary. "A hair" should by understood as being synonymous with "at least one hair".

What is claimed is:

1. A method of generating a synthesized image of a hair, wherein the synthesized image of the hair includes the representation of the hair lying in a plane, the method comprising:
calculating with a computer the shape of the hair by applying a behavioral relationship determining the shape of the hair as a function of at least one physical parameter linked to a mechanical property of the hair, the at least one parameter comprising an ellipticity of the hair, wherein the behavioral relationship is given by the minimization of the following function:

$$E = \frac{K}{L}\int_0^1 \left[\frac{1}{2}(\tilde{k}(\tilde{s}) - \alpha)^2 + \frac{1}{\beta}\tilde{z}(\tilde{s})\right]d\tilde{s},$$

where $\alpha = Lk_0$ and $\beta = K/g\mu L^3$, and where L designates a length of the hair, $k_0$ a spontaneous curvature, K a bending moment, μ a linear density and g acceleration due to gravity, $\tilde{s}$ a curvilinear abscissa relative to the length of the hair, $\tilde{k}$ a local curvature relative to the length and $\tilde{z}$ a height relative to the length; and
producing an image of the hair of the shape that has been calculated in this way.

2. A method according to claim 1, wherein the at least one physical parameter comprises at least one parameter selected from the following list: the length of the hair, a radius or radii of the hair, a major radii of the hair, the spontaneous curvature of the hair relative to one or more axes, a density, a linear density of the hair, at least one angle of an embedment of the hair in a scalp, at least one bending moment of the hair, a Young's modulus, a Poisson coefficient, a spontaneous twist of the hair, a twist moment, a porosity of the hair.

3. A method according to claim 1, wherein elements for adjusting a simulation parameter and a calculated image are displayed on a same screen.

4. A method according to claim 1, wherein the behavioral relationship depends only on an embedment of the hair in a scalp and on two reduced parameters each depending on one or more physical parameters.

5. A method according to claim 1, wherein the at least one physical parameter varies as a function of the curvilinear abscissa measured along the hair.

6. A method of generating a synthesized image of a hair, wherein the synthesized image is a representation in perspective of the hair not entirely contained in a plane, the method comprising:
calculating with a computer the shape of the hair by applying a behavioral relationship determining the shape of the hair as a function of at least one physical parameter linked to a mechanical property of the hair, the at least one physical parameter comprising an ellipticity of the hair, wherein the behavioral relationship is given by a minimization of the following function E:

$$\frac{1}{2}\int \left[K_x^f(k_x(s) - k_x^0)^2 + K_y^f(k_y(s) - k_y^0)^2 + K^t(\tau(s) - \tau^0)^2\right]ds + S\rho g \int (L-s)\frac{dz(s)}{ds}ds$$

where
ρ designates a density of the hair, L the hair total length, S an area of the hair section and g an acceleration due to a gravity, $K_x^f$ and $K_y^f$ bending moments in x and y directions, respectively, $K^t$ a twisting moment, s a curvilinear abscissa, $k_x(s)$, $k_y(s)$, and τ(s) curvatures in the x and y directions and a twist in a gravitational field, respectively, $k_x^0, k_y^0$ and $\rho^0$ spontaneous curvatures in the x and y directions and a spontaneous twist, respectively, and z(s) a height of the hair; and
producing an image of the hair of the shape that has been calculated in this way.

7. A method according to claim 6, wherein the at least one physical parameter comprises at least one parameter selected from the following list: a length of the hair, a radius or radii of the hair, major radii of the hair, the spontaneous curvature of the hair relative to one or more axes, the density, a linear density of the hair, at least one angle of an embedment of the hair in a scalp, at least one bending moment of the hair, a Young's modulus, a Poisson coefficient, the spontaneous twist of the hair, a twist moment, a porosity of the hair.

8. A method according to claim 6, wherein elements for adjusting a simulation parameter and a calculated image are displayed on a same screen.

9. A method according to claim 6, wherein the behavioral relationship depends on three angles defining an embedment of the hair in a scalp and at least two reduced parameters, a first reduced parameter depending on a natural curvature of the hair and a second reduced parameter depending on the length of the hair and the acceleration due to gravity.

10. A method according to claim 6, wherein the at least one physical parameter varies as a function of the curvilinear abscissa measured along the hair.

11. A method according to claim 6, wherein the behavioral relationship depends only on an embedment of the hair in a scalp and on two reduced parameters each depending on one or more physical parameters.

12. An interactive system for representing a hair, comprising:
a computer for calculating the shape of a hair by applying a behavioral relationship determining the shape of the hair as a function of at least one physical parameter linked to a mechanical property of the hair, the at least one physical parameter comprising an ellipticity of the hair; and a device for generating an image of said hair the shape of which has been calculated in this way, wherein the representation of the hair is a representation of the hair lying in a plane, and wherein the behavioral relationship is given by the minimization of the following function:

$$E = \frac{K}{L} \int_0^1 \left[ \frac{1}{2}(\tilde{k}(\tilde{s}) - \alpha)^2 + \frac{1}{\beta}\tilde{z}(\tilde{s}) \right] d\tilde{s},$$

where $\alpha = Lk_0$ and $\beta = K/g\mu L^3$, and where L designates a length of the hair, $k_0$ a spontaneous curvature, K a bending moment, $\mu$ a linear density and g an acceleration due to gravity, $\tilde{s}$ a curvilinear abscissa relative to the length of the hair, $\tilde{k}$ the hair local curvature relative to the hair length and $\tilde{z}$ the hair height relative to the hair length.

13. A system according to claim 12, further including an element for adjusting the at least one physical parameter.

14. A system according to claim 13, wherein the adjustment element includes a cursor mobile between at least two positions corresponding to different values of a physical parameter.

15. A system according to claim 13, including a field in which the value of a physical parameter may be displayed and modified.

16. A system according to claim 12, wherein the device for generating a synthesized image of the hair includes display means.

17. A system according to claim 12, wherein the at least one physical parameter comprises at least one parameter selected from the following list: the length of the hair, a radius or radii of the hair, major radii of the hair, a spontaneous curvature of the hair relative to one or more axes, a density, the linear density of the hair, at least one angle of an embedment of the hair in the scalp, a bending moment of the hair, a Young's modulus, a Poisson coefficient, a spontaneous twist of the hair, a twisting moment, a porosity of the hair.

18. A system according to claim 12, wherein the computer enables a display of an element for adjusting a parameter and a calculated image on a same screen.

19. A system according to claim 12, enabling a display on a screen of elements for adjusting a plurality of physical parameters characteristic of the shape of the hair represented.

20. A system according to claim 12, wherein the behavioral relationship depends only on an embedment of the hair in a scalp and two reduced parameters each depending on one or more physical parameters.

21. A system according to claim 12, wherein a synthesized image is a representation in perspective of the hair not entirely contained in the plane.

22. A system according to claim 21, wherein the physical parameters include at least two angles characteristic of an embedment of the hair in its support.

23. A system according to claim 21, wherein the behavioral relationship depends on three angles defining the embedment of the hair in a scalp and at least two reduced parameters, a first reduced parameter depending in particular on a natural curvature of the hair and a second reduced parameter depending in particular on the length of the hair and the acceleration due to gravity.

24. A system according to claim 23, wherein the behavioral relationship is given by the minimization of the following function E:

$$\frac{1}{2} \int \left[ K_x^f (k_x(s) - k_x^0)^2 + K_y^f (k_y(s) - k_y^0)^2 + K^t(\tau(s) - \tau^0)^2 \right] ds +$$

$$S\rho g \int (L-s) \frac{dz(s)}{ds} ds$$

where $\rho$ designates the density of the hair, L the hair total length, S the area of the hair section and g the acceleration due to gravity, $K_x^f$ and $K_y^f$ the x-axis and y-axis bending moments, respectively, $K^t$ the twisting moment, s the curvilinear abscissa, $k_x(s)$, $k_y(s)$ and $\tau(s)$ the x-axis and y-axis curvatures and the twist in the gravitational field, respectively, $k_x^0$, $k_y^0$ and $\tau^0$ the x-axis and y-axis spontaneous curvatures and a spontaneous twist, respectively, and z(s) the height of the hair.

25. A system according to claim 12, including means for representing said hair in relief.

26. A system according to claim 12, wherein the physical parameters do not include a color of the hair.

27. A system according to claim 12, further including a database including information linked to an evolution of a physical parameter of a hair as a function of a treatment applied to the hair.

28. A system according to claim 27, wherein the treatment is selected from the following list: permanent waving, crimping, decrimping, dyeing, drying of a wet hair, application of a composition to the hair, in particular a coating composition, application of a gel, setting, cutting, conditioning, thickening, lengthening, external climatic events, in particular rain, wind, sun.

29. A system according to claim 28, wherein two treatments differ from each other at least in a quantity of composition applied, a thickness of the layer of composition applied, a duration of the treatment, a diameter of a crimping iron, a temperature of the crimping iron.

30. A system according to claim 28, wherein the treatment varies as a function of the curvilinear abscissa measured along the hair.

31. A system according to claim 12, wherein the device for generating images is configured to generate a virtual image of said hair after the application of a treatment.

32. A system according to claim 31, wherein the device for generating images is configured to display simultaneously an image of the hair before treatment and an image of the hair after application of the treatment.

33. A system according to claim 12, wherein the at least one physical parameter varies as a function of the curvilinear abscissa measured along the hair.

* * * * *